United States Patent [19]

Turner

[11] Patent Number: 4,810,131
[45] Date of Patent: Mar. 7, 1989

[54] LANDFILL LEACHATE COLLECTION AND LEAK DETECTION SUMP SYSTEM

[75] Inventor: Dennis M. Turner, Clute, Tex.

[73] Assignee: The Dow Chemical Company, Midland, Mich.

[21] Appl. No.: 205,134

[22] Filed: Jun. 10, 1988

[51] Int. Cl.$^4$ ............... B65G 5/00; E02D 31/00
[52] U.S. Cl. ................... 405/129; 405/38; 405/53; 210/170
[58] Field of Search ............ 405/38, 53, 128, 129, 405/258, 270; 210/170

[56] References Cited

U.S. PATENT DOCUMENTS

| | | | |
|---|---|---|---|
| 4,350,461 | 9/1982 | Valiga | 405/128 |
| 4,451,173 | 5/1984 | Watson et al. | 405/53 |
| 4,526,615 | 7/1985 | Johnson | 405/129 X |
| 4,543,013 | 9/1985 | Wagner et al. | 405/128 |

OTHER PUBLICATIONS

"Minimum Technology Guidance on Double Liner Systems for Landfills and Surface Impoundments-Design, Construction, and Operation", EPA/530-S-W-85-014, Second Version, May 24, 1985.

*Primary Examiner*—David H. Corbin
*Attorney, Agent, or Firm*—Joe R. Prieto

[57] ABSTRACT

A landfill leachate collection and removal system in combination with a leachate and leakage detection system has been developed which includes a leachate collection sump intended to receive all of the rain which falls within the confines of the landfill. This rainfall may flow across the landfill floor to a sump or it may "leach" downward through waste into a drainage media and on to the sump. Further downward percolation of water is prevented by a first liner. The landfill system includes a leak detection sump system, intended to collect only that leachate which passes or leaks through the first liner. Both the collection and detection sumps are fabricated for examples, from high density polyethylene. Both sumps are perforated at definite elevations and both sumps rest in a concrete basin. A second liner lies between the sump bottoms and the concrete basin and the first liner is preferably welded to flanges on the sumps.

10 Claims, 2 Drawing Sheets

LANDFILL LEACHATE COLLECTION AND LEAK DETECTION SUMP SYSTEM

BACKGROUND OF THE INVENTION

This invention relates to a combination landfill leachate collection and leachate leak detection system.

Government regulations have made it a requirement for the industry to construct landfills for waste disposal to protect natural ground water resources from contamination by wastes. For example, the Environmental Protection Agency (EPA) requires landfills to be constructed with liners below the waste landfill as barriers against the penetration of waste to the ground water.

Prior to environmental regulations, the general practice of the industry was to provide an unlined excavation or a single lined excavation. However, because of recent environmental concerns and an increasing demand for the protection of ground water resources, stricter environmental regulations are being enforced. For example, the EPA has now made it a requirement for landfills to contain at least two liners separating the waste in the landfill from the natural soil. The EPA requires that a double liner landfill system be designed, constructed and operated to protect human health and the environment. In addition, the EPA requires a leachate collection and removal system in combination with a leachate leak detection system incorporated into the construction of a landfill. While the EPA has published general guidelines for constructing a double liner landfill system, the guidelines provide no specifics on the final construction of a landfill system. Much of the detail construction of the double liner landfill system is left up to the innovation of the owner of such landfill.

The EPA guidelines disclose that a sump system for landfills can be used, but do not describe a sump system which provides support for the necessary pumps, piping or structures for personnel access.

In some landfill installations it is known to use a small leak detection pipe extending down the slope of a landfill cell levee between two liners. In this type of system it is very difficult to determine the level of leachate leakage and to pump the leachate out of the cell.

It is desired to provide a novel and dependable landfill system to comply with EPA requirements. More specifically, it is desired to provide a landfill system which utilizes at least two sumps and which:

1. is capable of detecting, collecting and removing leachate in the landfill through the life of the landfill;
2. is easy to construct and maintain for the life of the landfill; 3. is chemically resistant to wastes or leachate present in the landfill;
4. is structurally strong enough to support sump pumps and piping;
5. is capable of withstanding the stresses and disturbances from overlying wastes and operating practices;
6. permits knowledge of leachate levels in the sumps;
7. allows easy sampling and withdrawal of leachate from the sumps;
8. provides maximum protection against leakage around the sumps; and
9. is acceptable to governmental regulatory agencies.

SUMMARY OF THE INVENTION

One aspect of the present invention is a combination landfill leachate collection and leachate leak detection system including;

a. a sump basin disposed above at least one layer of compacted material;

b. at least a first and a second vertical sump disposed generally above said sump basin;

c. at least a first liner material general to the first and second sumps and annularly and sealably attached to said first and second sumps; said first liner disposed above separate and spaced apart from said sump basin;

d. at least a second liner material interposed between the bottoms of said first and second sumps and the sump basin; said first liner material disposed above, separate and spaced apart from said second liner material; said first liner adapted for containing leachate and directing said leachate to the first sump; said second liner adapted for containing leachate and directing said leachate to the second sump;

e. at least one layer of porous drainage media material interposed between the first and second liners; and f. at least one layer of porous drainage media disposed above said first liner material;

said first sump having a plurality of perforations disposed above the first liner for passing leachate therethrough; said first sump adapted for collecting leachate therein and removing said collected leachate; said second sump having a plurality of perforations disposed between the first liner and the second liner for passing leachate therethrough; said second sump adapted for detecting leachate leaked through the first liner and further adapted for collecting leachate leaked through the first liner and removing said collected leachate.

Another aspect of the present invention is a process for collecting leachate and detecting leachate leakage in a landfill system comprising:

a. disposing at least a first and second vertical sump generally above a sump basin;

b. forming at least a first layer for collecting leachate; said first layer including at least a first liner material attached to the first sump; said first sump having a plurality of orifices for passing leachate therethrough;

c. attaching said first liner material to said first sump such that the orifices of the first sump are disposed above said first liner;

d. forming at least a second layer for collecting leachate; said second layer including at least a second liner material disposed below second sump; said second sump having a plurality of orifices for passing leachate therethrough;

e. disposing said second linear material below said second sump such that the orifices of the second sump are disposed between the first liner material and the second liner material;

f. attaching said first liner to said second sump above the orifices of the second sump for preventing leachate in first layer from entering said second sump orifices whereby leachate leakage from said first layer is detected by said second sump;

g. collecting leachate in first sump and h. removing said collected leachate from said first sump.

DETAILED DESCRIPTION OF THE PREFERRED EMBODIMENTS

The landfill leachate collection sump system of the present invention is intended to receive all of the rain which falls within the confines of the landfill. This rainfall may flow across the landfill floor to a sump or it may "leach" downward through waste into a drainage media layer and on to the sump. Further downward percolation of water is prevented by a first liner. The landfill leak detection sump system of the present invention is intended to collect only that leachate which passes (i.e. leaks) through the first liner due to for example, a puncture of the first liner. Both the collection and detection sumps are fabricated from plastic material. Both sumps are perforated at definite elevations and both sumps rest in a reinforced concrete basin. A second liner lies between the bottoms of the sumps and the concrete basin and the first liner is preferably welded to flanges on the sumps.

Figure 1:
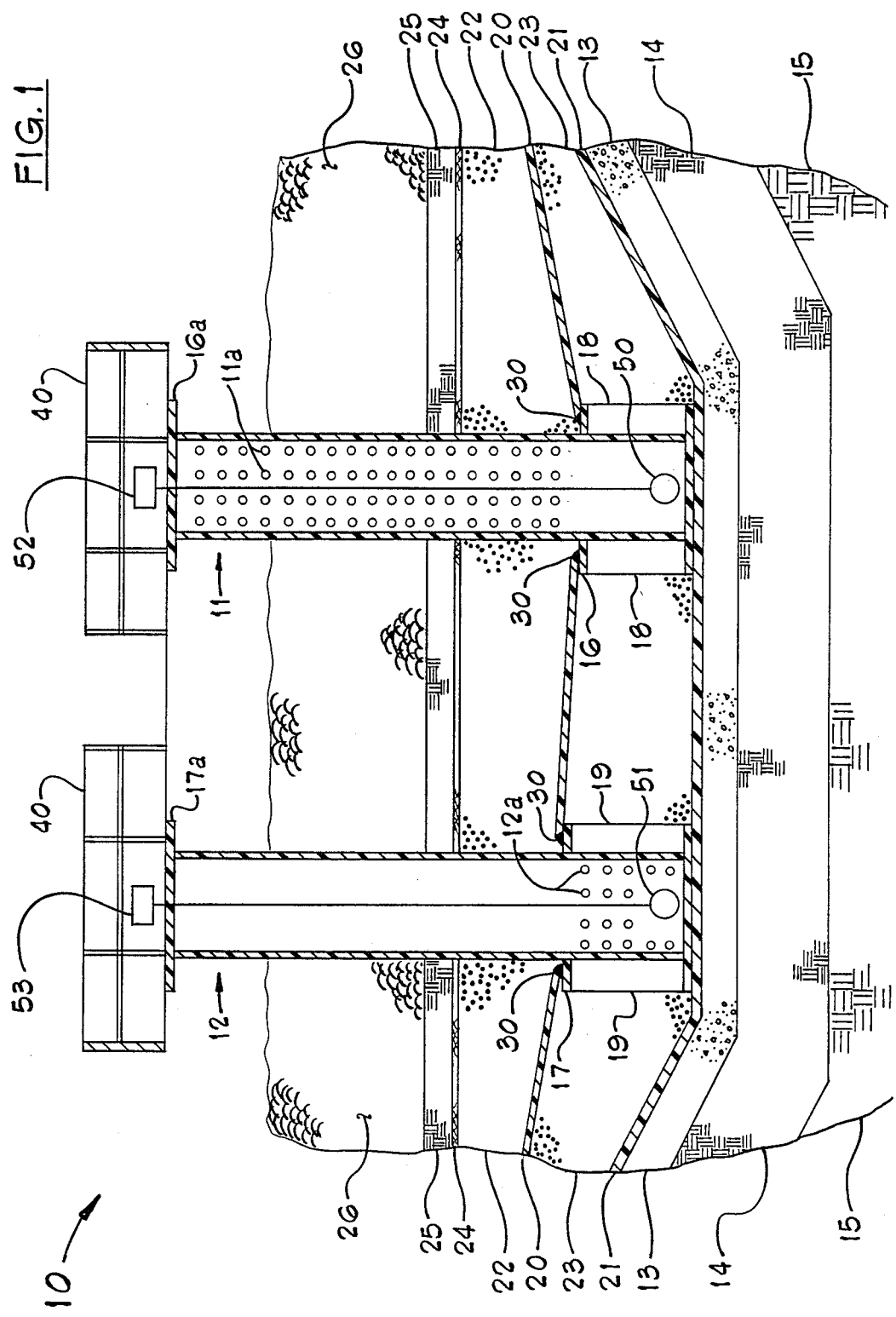
FIG. 1 is a cross-sectional side view showing the system of the present invention.
Figure 2:
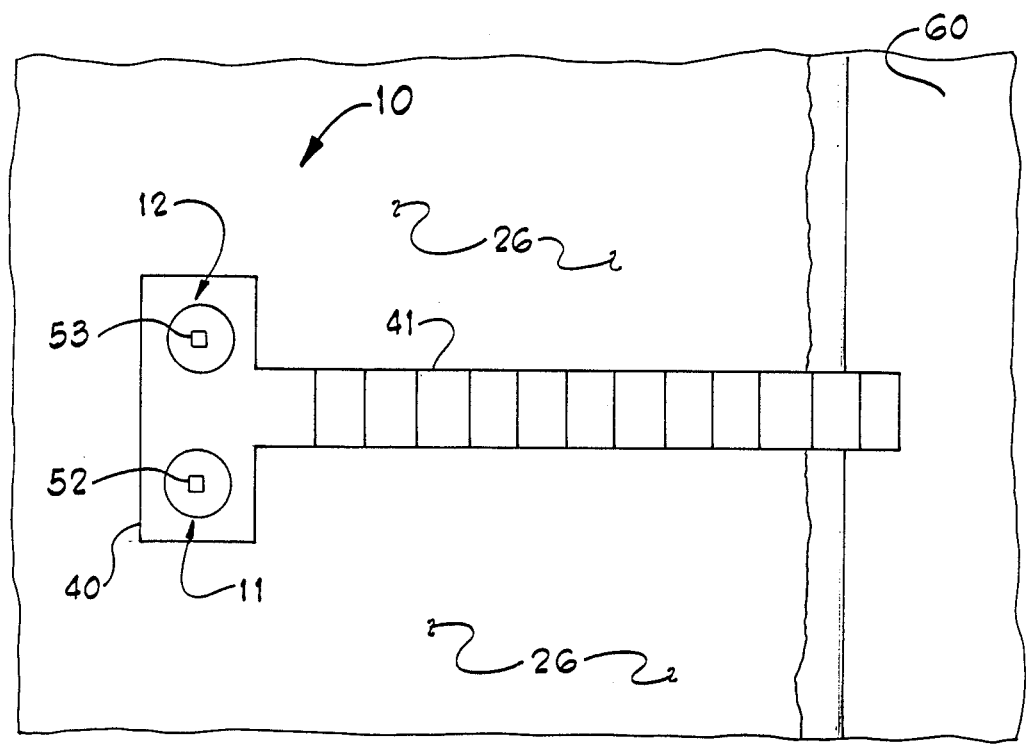
FIG. 2 is a top view showing the system of the present invention.
Figure 3:
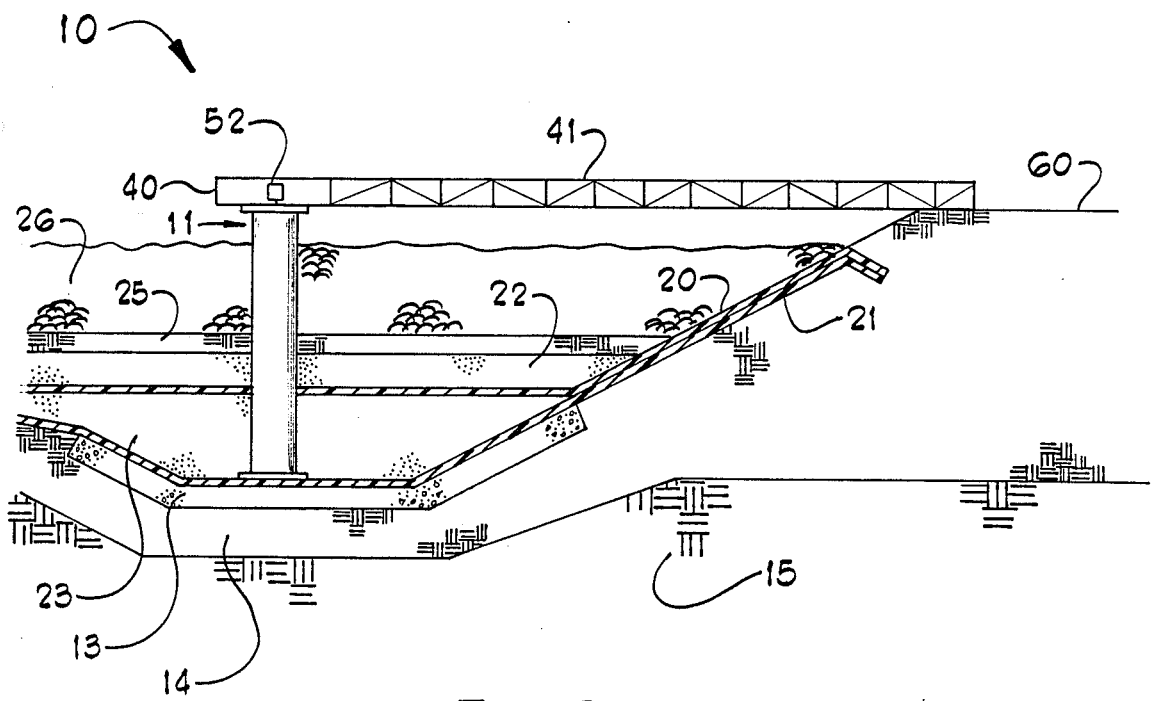
FIG. 3 is a partially schematic, partially in cross-section view showing the system of the present invention.

With reference to FIGS. 1–3, there is shown a combination landfill leachate collection and leachate leakage detection system generally indicated by reference numeral 10 and hereinafter referred to as the landfill 10.

The landfill 10 includes at least two vertical sumps 11 and 12 disposed above a sump basin 13. The sumps 11 and 12, in this instance, are cylindrical in shape. The present landfill system uses, for example, vertical 48 inch diameter pipe to construct the sumps. With the use of the sumps of the present landfill, leachate levels are easily obtainable, manually or by conventional instrumentation. In addition, the sumps are large enough such that personnel can be lowered into the sumps for inspection, if required. Preferably the sumps 11 and 12 are made entirely of a plastic material chemically resistant to the waste and leachate, such as a high density polyethylene (HDPE) material with wall thicknesses, for example, in the range of from about 1.0 to about 3.0 inches, preferably from about 2.0 to about 2.5 inches, which are capable of carrying several thousand pounds of load.

The basin 13 is made of conventional materials such as concrete and of sufficient thickness to provide a support platform for the sumps 11 and 12. Preferably, the concrete basin 13 has a thickness of about 12 inches or greater. The concrete basin also provides for leachate containment in case the other layers of material above the basin leak leachate. The basin 13 is disposed above a layer of "compacted material" 14 such as clay material which is provided above the natural soil 15. "Compacted material" herein means any naturally occurring soil that can be compacted, with or without man made additives, into a liner with a permeability of $1 \times 10^{-7}$ cm/sec or less. For example, the compacted materials may include soil, cement/soil mixtures, lime/soil mixtures or fly ash/soil mixtures. The compacted material layer 14 is advantageously used as a backup liner for leachate containment in case the any layers above the compacted layer 14 material allow leachate leakage to occur.

The sumps 11 and 12 each contain an annularly disposed flange ring member, 16 and 17, respectively, with one or more flange support plates 18 and 19, respectively, for supporting the flange members 16 and 17. Preferably, the sumps 11 and 12 have flange members 16a and 17a for ease in connection of platforms 40 and walkway 41. The platforms 40 and walkway 41 advantageously provide operating personnel access to the landfill's sumps and equipment without physically coming into contact with the waste material below the walkways and, thus, making the landfill a safe system for personnel to operate.

A first liner material 20 is sealably attached to the flange member 16 and 17 of the sumps 11 and 12, respectively, and the first liner 20 serves as a primary leachate collection system liner. The first liner 20 will be interchangeably referred to herein as a top liner or primary liner 20.

The primary liner 20 is constructed of a material to prevent the migration of any hazardous constituents through such liner during its operation. The primary liner 20 should be chemically resistant to the waste and leachate. The primary liner 20 can be, for example, polyvinyl chloride (PVC), polyvinyl chloride oil resistant (PVC-OR), chlorinated polyethylene (CPE), butyl rubber (IIR), polychloroprene (CR), high density polyethylene (HDPE), ethylenepropylene diene terpolymer (EPDM), epichlorohydrin polymers (CO), polyethylene ethylene propylene alloy (PE-EP-A), high density polyethylene elastomeric alloy (HDPE-A), chlorosulfonated polyethylene (CSPE), chlorosulfonated polyethylene; low water absorption (CSPE-LW), thermoplastic nitrile-PVC (TN-PVC), thermoplastic EPDM (T-EPDM), ethylene interpolymer alloy (EIA), and chlorinated polyethylene alloy (CPE-A). Preferably a flexible membrane liner material made of HDPE is used.

The present system advantageously and preferably utilizes all welded high density polyethylene liner material. The use of HDPE as a liner and sump material is an advantage over some installations which use mechanical clamps to secure the liner to the sumps and other piping at the point of liner penetration because metal clamps can corrode and leak and repair is extremely difficult. A liner-to-sump weld protects against leakage via welding of liner to the sump instead of mechanical clamps. Welding is carried out by using rope of the same plastic HDPE material as flange members 16 and 17 of sumps 11 and 12, respectively, and fusing and melting the HDPE primary liner 20 with the HDPE rope to the plastic HDPE flange members 16 and 17 at fusion points 30.

Preferably, a second liner 21 is laid on top of the sump basin 13 and interposed between the bottom of the sumps 11 and 12 and the sump basin 13 to serve as a secondary leachate collection system liner. The second liner 21 will be interchangeably referred to as a bottom liner or secondary liner 21. The secondary liner 21 is used to contain any leachate that may leak through the first top liner 20. The secondary liner 21 is constructed of a material to prevent the migration of any hazardous constituents through such liner during its operation. The secondary liner 21 should be chemically resistant to the waste and leachate. The secondary liner 21 can be made of any material the top liner 20 can be made of as described above. Preferably, the secondary liner 21 is made of identical material as the primary liner 20. Preferably, a flexible membrane liner material made of high density polyethylene material is used for the secondary liner 21.

The thicknesses of the primary liner 20 and the secondary liner may vary depending on the expected operating period of the landfill, pressure gradients, physical contact with waste and leachate, climatic conditions, stress of installation, and the stress of daily operation, e.g. placing wastes in landfill. It is preferred that the thickness of the primary liner 20 and the secondary liner 21 be from about 60 to about 120 mils thick and preferably from about 80 to 100 mils thick. While liners having a thickness of less than about 60 mils may be used, generally, the liners with less than a thickness of about 60 mils lack sufficient structural strength and are difficult to weld to the sumps. Liners with a thickness of above about 120 mils may be used, but are generally not readily available and no additional increase in effectiveness in linear protection is apparent with such thicker liners.

Optionally, the primary liner 20 and/or secondary liner 21 may be a composite liner, i.e., consist of two or more liner components that are intended to function as one system. Generally, the bottom component of a multi-component composite liner is adapted for minimizing migration of any constituent through the bottom component liner if a breach in the top components of the composite liner occurs during its operation.

The two cylindrical shaped vertical sumps 11 and 12 are disposed above the sump basin 13 with the bottom of the sumps resting on the secondary liner 21. Optionally, a synthetic fabric filter, such as geotextile, may be placed between the bottom of the sumps 11 and 12 and the secondary liner material 21.

Above the primary liner 20 is disposed a primary drainage media 22. Any porous material can be used as the drainage media which is chemically resistant to waste and leachate. For example, sand is used. Other porous material useful for the primary drainage media includes pea gravel or any synthetic granulated material chemically resistant to waste and leachate. The thickness of the primary drainage media layer 22 should be sufficiently thick to convey leachate to sump 11 and to support a load thereon, such as vehicular traffic during placement of waste, without damaging the primary liner 20. Preferably the thickness of the layer 22 is about 12 inches or greater. The permeability of the drainage media 22 should be greater than about $1 \times 10^{-2}$ cm/sec. While not shown in FIG. 1, a drainage net made of HDPE material can be installed between the primary liner 20 and the drainage media 22 to speed up or increase the flow of leachate to the sump 11.

Between the primary liner 20 and secondary liner 21 is disposed a secondary drainage media 23. Any porous material can be used for the drainage media 23 which is chemically resistant to waste and leachate such as sand. Other porous materials used for the drainage media 23 includes pea gravel and any synthetic granulated material chemically resistant to waste and leachate. The thickness of the secondary drainage media layer should be sufficiently thick to convey leachate leakage to sump 12. Preferably, the thickness of layer 23 is about 6 inches or greater. The permeability of the media 23 should be greater than about $1 \times 10^{-2}$ cm/sec. While the landfill 10, as a whole, may cover from a fraction of an acre to several acres, in one embodiment, the secondary drainage media 23 may extend over the immediate area surrounding the sumps 11 and 12 only, with the rest of the landfill area defining the layer 23 made of a drainage net material. Of course the drainage media layer 23 may also extend throughout the entire landfill 10 as do the other layers of the present invention.

Above the primary drainage media 22 is disposed a "filter" layer 24 and a "working surface" layer 25. By "filter" 24 it is meant a layer of filter material for preventing the "working surface" 25 from migrating into the primary drainage media 22. For example, the filter may be a filter cloth. By "working surface" 25 it is meant spacing a layer of material laid on top of the primary drainage media 22 for vehicular traffic during placement of wastes. For example, the working surface can be sandy clay. The filter cloth 24 is disposed between the working surface 25 and the primary drainage media 22 and is preferably made of a filter cloth of a synthetic geotextile which prevents clogging of the voids in the drainage media 22 by infiltration of fines from the washing surface or wastes.

Waste 26 is disposed above the working surface 25. The waste 26 may include any solidified waste product, ash or contaminated soils that can be disposed on the working surface and held thereby.

The landfill 10 of the present invention is advantageously easily maintainable and serviceable. For example, installed in the field, the sumps 11 and 12 may have an access platform 40 attached on top of the flanges 16a and 17a, respectively, to provide access to pumps 50 and 51, pump motors 52 and 53 and other equipment (not shown) for operating the sumps 11 and 12. The platform 40 allows personnel to operate and maintain the sumps. The landfill 10 and sumps 11 and 12 are advantageously structurally strong enough to support the equipment and personnel. The platform 40 allows personnel access to the sumps 11 and 12 from a levee 60 surrounding the landfill 10 through a bridge or walkway 41 extending from the levee 60 to the access platform 40.

In operation, rainfall percolates down sloping grades on the top surface of the primary liner 20 toward the sumps 11 and 12. The slope of the primary liner 20 is sufficient to promote drainage, preferably at about 2 percent or more. The sumps are used for removing leachate from the landfill. Sump 11 is primarily a rainfall and leachate collection sump and sump 12 is primarily a leak detection sump. Because the orifices 12a of the detection sump 12 are below the primary liner 20 all of the rainfall on the surface of the primary liner 20 collects in sump 11 and enters the sump 11 through orifices 11a. Leachate is collected in the bottom, unperforated portion of the leachate collection sump 11 and no hydraulic head of leachate is allowed to remain on the primary liner 20. this prevents possible damage to the primary liner 20.

After the rainfall and leachate collects in sump 11, a pump 50 then pumps the liquid to above-ground treatment facilities (not shown). If a hole in the primary liner 20 occurs due to deterioration, puncture, rips or tears, the liquid which leaks through the primary liner 20 will percolate through the layer 23 to the surface of the secondary liner 21. The sloping grade on the top surface of secondary liner 21 is sufficient to direct liquid toward the sumps 11 and 12. Preferably, the slope of the secondary liner 21 may be about 2 percent or greater. However, because the orifices 11a of the sump 11 are above the primary liner 20, the liquid above the secondary liner 21 collects at sump 12 and enters sump 12 through orifices 12a. The level of liquid in sump 12 is then detected by any conventional liquid level detector equipment. After the level of liquid reaches a predetermined level, a pump 51 then pumps the liquid in sump 12 to an above-ground treatment facility (not shown). The sump 12 is used to determine if leakage is occurring in the primary liner 20. Even if the primary liner 20 leaks, no hydraulic head or pressure on the secondary liner 21 should exist due to the highly permeable secondary drainage media 23 and the slope of the secondary liner 21. The present invention provides for rapid transport of any primary liner 20 leakage to the leak detection sump 12 as well as rapid detection and removal of the leakage.

What is claimed is:

1. A combination landfill leachate collection and removal system and leachate leakage detection system comprising:
   a. a sump basin disposed above at least one layer of compacted material;
   b. at least a first and a second vertical sump disposed generally above said sump basin;
   c. at least a first liner material general to the first and second sumps and annularly and sealably attached to said first and second sumps; said first liner disposed above, separate and spaced apart from said sump basin;
   d. at least a second liner material interposed between the bottoms of said first and second sumps and the sump basin; said first liner material disposed above, separate and spaced apart from said second liner material; said first liner adapted for containing leachate and directing said leachate to the first sump; said second liner adapted for containing leachate and directing said leachate to the second sump;
   e. at least one layer of porous drainage media material interposed between the first and second liners; and
   f. at least one layer of porous drainage media disposed above said first liner material;

said first sump having a plurality of perforations disposed above the first liner for passing leachate therethrough; said first sump adapted for collecting leachate therein and removing said collected leachate; said second sump having a plurality of perforations disposed between the first liner and the second liner for passing leachate therethrough; said second sump adapted for detecting leachate leaked through the first liner and further adapted for collecting leachate leaked through the first liner and removing said collected leachate.

2. The system of claim 1 wherein the sumps are made of high density polyethylene.

3. The system of claim 1 wherein the first and second liner material is high density polyethylene.

4. The system of claim 1 wherein the first and second liners are sloped at about 2 percent or greater.

5. The system of claim 1 wherein the first and second sumps and first liner material are attached by welding to form a liquid-tight seal at the point of attachment.

6. A process for collecting leachate and detecting leakage of leachate in a landfill system comprising:
   a. disposing a first and second vertical sump generally above a sump basin;
   b. forming at least a first layer for collecting leachate; said first layer including at least a first liner material attached to the first sump; said first sump having a plurality of orifices for passing leachate therethrough;
   c. attaching said first liner material to said first sump such that the orifices of the first sump are disposed above said first liner;
   d. forming at least a second layer for collecting leachate; said second layer including at least a second liner material disposed below said second sump; said second sump having a plurality of orifices for passing leachate therethrough;
   e. disposing said second liner material below said second sump such that the orifices of the second sump are disposed between the first liner material and the second liner material;
   f. attaching said first liner to said second sump above the orifices of said second sump for preventing leachate in first layer from entering said second sump orifices whereby leachate leakage from said first layer is detected by said second sump;
   g. collecting leachate in first sump and
   h. removing said collected leachate from said first sump.

7. The process of claim 6 wherein the sumps are made of high density polyethylene.

8. The process of claim 6 wherein the first and second liner material is high density polyethylene.

9. The process of claim 6 wherein the first and second liners are sloped at about 2 percent or greater.

10. The process of claim 6 wherein the first and second sumps and first liner material are attached by welding to form a liquid-tight seal at the point of attachment.

* * * * *